US008667909B2

(12) United States Patent
Ruzicka

(10) Patent No.: US 8,667,909 B2
(45) Date of Patent: Mar. 11, 2014

(54) ADJUSTABLE ATTACHMENT DEVICE FOR FURNITURE

(75) Inventor: Pavel Ruzicka, Pennsburg, PA (US)

(73) Assignee: Knoll, Inc., East Greenville, PA (US)

( * ) Notice: Subject to any disclaimer, the term of this patent is extended or adjusted under 35 U.S.C. 154(b) by 0 days.

(21) Appl. No.: 13/478,665

(22) Filed: May 23, 2012

(65) Prior Publication Data

US 2012/0304902 A1 Dec. 6, 2012

Related U.S. Application Data

(60) Provisional application No. 61/493,215, filed on Jun. 3, 2011.

(51) Int. Cl.
*A47B 13/00* (2006.01)

(52) U.S. Cl.
USPC .......................................... 108/153.1

(58) Field of Classification Search
USPC ................... 108/153.1, 154, 155, 156, 157.1, 108/157.15, 159.11, 158, 158.11–158.13; 248/188, 188.1, 188.8
See application file for complete search history.

(56) References Cited

U.S. PATENT DOCUMENTS

| | | | | |
|---|---|---|---|---|
| 3,008,741 A | * | 11/1961 | MacCormack | 403/7 |
| 3,636,894 A | * | 1/1972 | Hage | 108/156 |
| 3,992,808 A | * | 11/1976 | Stengel | 47/1.1 |
| 5,845,962 A | * | 12/1998 | Lin | 297/54 |
| 6,062,149 A | * | 5/2000 | Duvivier et al. | 108/158.11 |
| 2006/0130716 A1 | * | 6/2006 | Ashby et al. | 108/125 |
| 2006/0278139 A1 | * | 12/2006 | Korb | 108/155 |
| 2009/0183656 A1 | * | 7/2009 | Karrasch et al. | 108/154 |

FOREIGN PATENT DOCUMENTS

| | | |
|---|---|---|
| DE | 1087568 B | 8/1960 |
| EP | 2039263 A1 | 3/2009 |
| FR | 2468828 A1 | 5/1981 |

OTHER PUBLICATIONS

International Search report for PCTUS2012/039239 dated Sep. 11, 2012.

Written Opinion of the International Searching Authority for PCTUS2012/039239 dated Sep. 11, 2012.

* cited by examiner

*Primary Examiner* — Matthew Ing
(74) *Attorney, Agent, or Firm* — Buchanan Ingersoll & Rooney PC

(57) ABSTRACT

An article of furniture includes a support and a plurality of members, each of the members extending along the bottom face of the support. Each of a plurality of attachment devices attaches a respective one of a plurality of legs to one of the members such that each of the members is attached to at least one of the legs. The attachment devices include multiple bodies and multiple fasteners. Each of the attachment devices are able to be adjusted as needed to account for slight manufacturing discrepancies that may occur due to manufacturing tolerance ranges so that the legs attached to the members via the attachment devices are positionable where desired in accordance with a predetermined design.

21 Claims, 5 Drawing Sheets

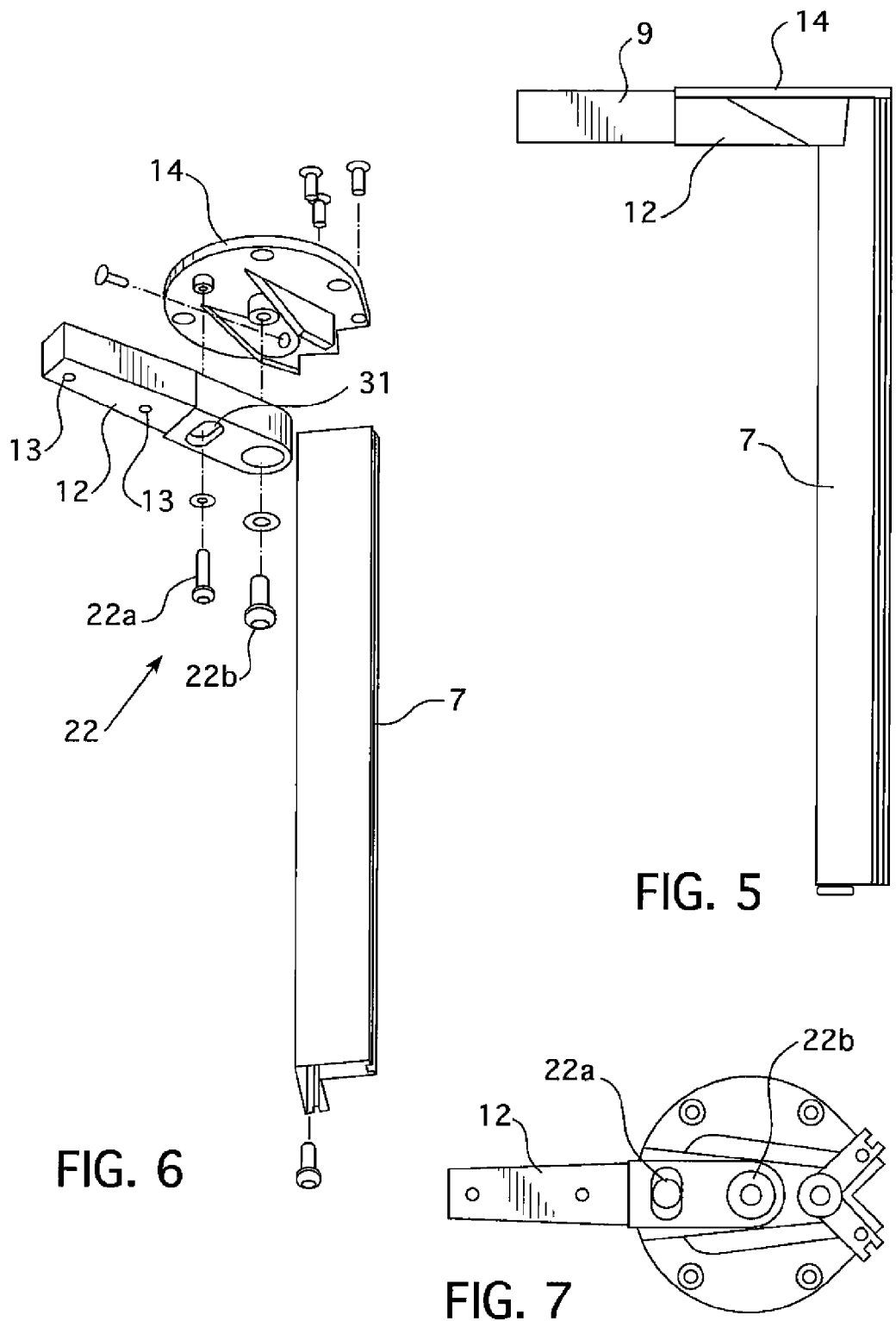

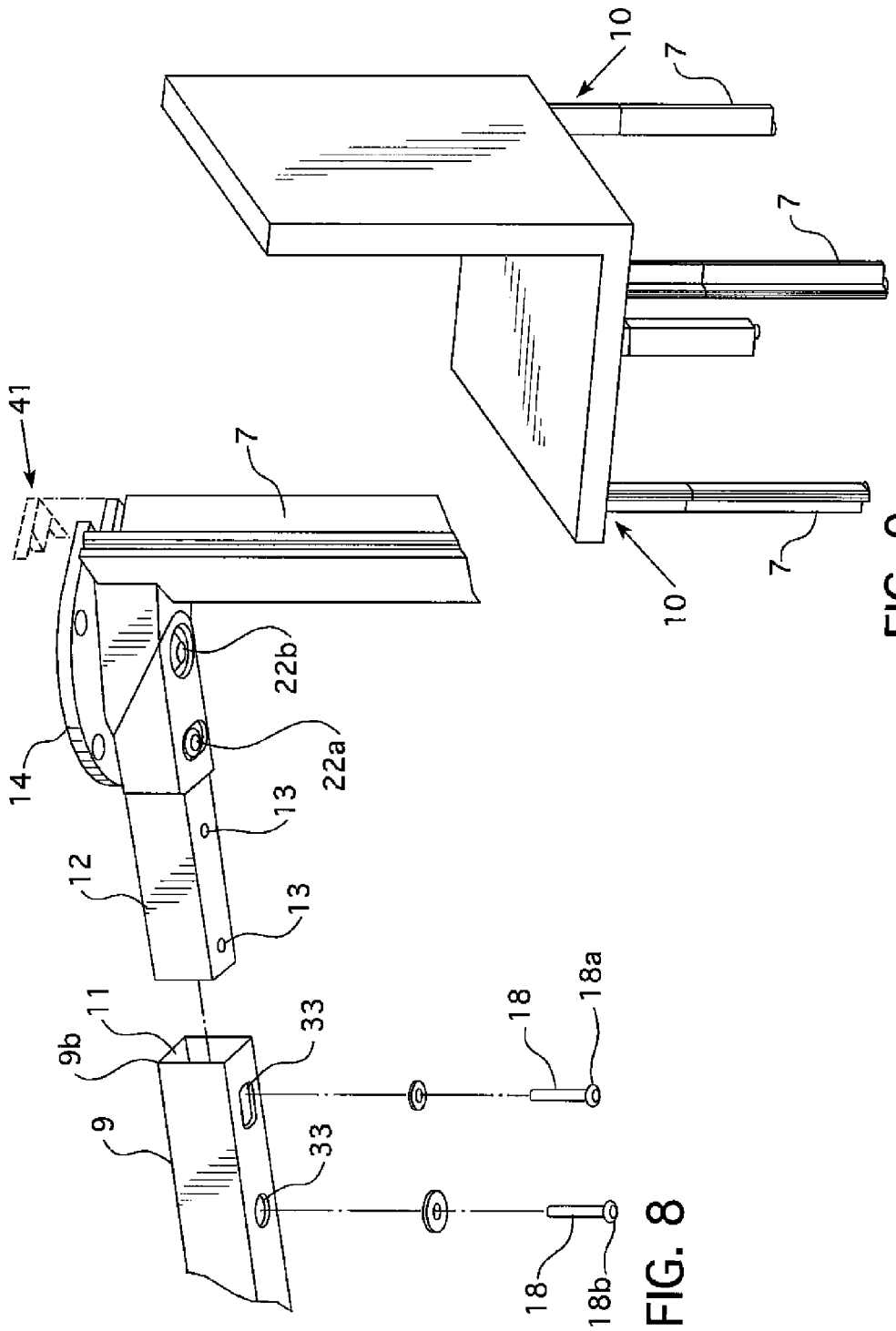

ADJUSTABLE ATTACHMENT DEVICE FOR FURNITURE

CROSS-REFERENCE TO RELATED APPLICATIONS

The present application claims priority to U.S. Provisional Application No. 61/493,215, which was filed on Jun. 3, 2011.

FIELD OF INVENTION

The present invention relates to furniture, such as tables or chairs. More particularly, the present invention relates to an adjustable attachment device for attaching legs or supports to furniture, such as tables or chairs.

BACKGROUND OF THE INVENTION

Tables and other furniture often have legs or supports that extend from the ground or a floor to support a work surface, such as a tabletop of a table or a seat of a chair. Often, the manufacture of such chairs or tables requires the legs to be attached to corners or other locations of the structure defining the work surface or seating surface. For instance, legs may be required to be attached near the four corners of a rectangular tabletop in some table designs. Depending on the design and manufacturing capabilities of a manufacturer, it may be necessary to permit the legs to be located in one of a number of locations to account for changes in tables that may result from the manufacturing process used to make the components of the article of furniture. This may be done by simply fastening a leg directly to the underside of a tabletop at these different locations.

The design of some furniture, however, may seek to maintain a desired aesthetic effect that would prevent an installer or fabricator from merely placing legs or supports in any location necessary to make the article of furniture. For instance, an undesirable location of the legs of a table may detract from the aesthetic effect sought by a particular table design. This may be particularly true for designs for tables that have very large tabletops, such as tabletops that have an area of at least forty-five square feet. It should be appreciated that such an undesirable location may be necessary for some manufacturers due to tolerance problems or other issues associated with mass producing an article of furniture in accordance with a particular design.

A new leg or support attachment device is needed that may permit the manufacture of an article of furniture to be achieved such that the furniture is able to be produced using mass production technologies while also permitting the article of furniture to be fabricated so that a desired aesthetic effect is not negatively impacted from the changes needed to the design to account for tolerance of manufacturing issues or other design implementation problems associated with mass manufacturing.

SUMMARY OF THE INVENTION

An article of furniture, such as a table, is provided. The article of furniture may include a work surface having an upper face and a bottom face opposite the upper face. The article may also include a plurality of members. Each of the members extends along the bottom face. Each of the members has a first end, a second end opposite the first end, and a channel. The first end has a first aperture. The channel extends through the first end. The article also includes a plurality of legs and a plurality of attachment devices. Each of the attachment devices attaches a respective one of the legs to one of the members such that each of the members is attached to at least one of the legs. Each of the attachment devices comprises a first body and a second body. The first body has a second aperture and a third aperture. The first body is moveable within the channel of the member to which the attachment device is attached. A first fastener extends through the second aperture of the first body and through the first aperture of the member to which the attachment device is attached such that the first body is moveable within the channel of the member along a length of one of the first aperture and the second aperture until the first fastener is tightened sufficiently to immovably affix the first body to the member to which the attachment device is attached. The second body has a fourth aperture that is alignable with the third aperture. The second body is attached to a respective one of the legs. A second fastener extends through the third aperture and the fourth aperture such that the second body is moveable along a length of one of the third aperture and the fourth aperture until the second fastener is tightened sufficiently to immovably affix the first body to the second body. The movement of the second body relative to the first body is a rotational movement and the movement of the first body in the channel is a linear movement.

Examples of an article of furniture may include a chair, a table, or a desk. It should be understood that the upper face of the work surface may be substantially flat in some embodiments. Of course, the bottom face may also be substantially flat in some embodiments.

The substantially linear movement may be a straight movement or a substantially straight movement (e.g. substantially forward, substantially rearward, or substantially sideward). The rotational movement may be a clockwise movement, a counter clockwise movement, or include a combination of both clockwise movement and counter clockwise movement.

At least one of the third aperture of the first body and fourth aperture of the second body of the attachment device may be a slot that has a length that extends in a first direction. At least one of the first aperture of the member and the second aperture of the first body may be a slot that has a length that extends in a second direction. The second direction may be transverse, substantially perpendicular, or perpendicular to the first direction. It should be understood that a perpendicular direction is an example of a transverse direction. In some embodiments, the slot of the third aperture or the slot of the fourth aperture may be curved.

Some embodiments may include four or more legs, members and attachment devices. For instance, the legs may include a first leg, a second leg, a third leg, and a fourth leg and the members may include a first member, a second member, a third member and a fourth member. The attachment devices may also include a first, second, third and fourth attachment devices. The first body of the first attachment device may be attached to the first member, the first body of the second attachment device may be attached to the second member, the first body of the third attachment device may be attached to the third member and the first body of the fourth attachment device may be attached to the fourth member. The second body of the first attachment device may be attached to the first leg, the second body of the second attachment device may be attached to the second leg, the second body of the third attachment device may be attached to the third leg, and the second body of the fourth attachment device may be attached to the fourth leg.

The work surface may have a plurality of edges that define a periphery of the work surface. Trim members may be attached to the edges of the work surface. Corner trim members may be attached between immediately adjacent trim members adjacent corners of the work surface that are defined by two immediately adjacent edges of the work surface. For instance, the work surface may be a tabletop that has four edges. A first trim member may be attached to a first edge, a second trim member may be attached to a second edge, a third trim member may be attached to a third edge and a fourth trim member may be attached to a fourth edge. A first corner member may be attached to the second body of one of the attachment devices so it is positioned adjacent to the first and second edges between the first and second trim members. A second corner member may be may be attached to the second body of one of the attachment devices so it is positioned adjacent to the second and third edges between the second and third trim members. A third corner member may be attached to the second body of one of the attachment devices so it is positioned adjacent to the third and fourth edges between the third and fourth trim members. A fourth corner member may be attached to the second body of one of the attachment devices so it is positioned adjacent to the first and fourth edges between the first and fourth trim members.

A method of installing or fabricating a table is also provided. The method includes the steps of attaching a member to a bottom surface of a tabletop such that the member extends along the bottom surface, placing a first body of an attachment device into a channel of the member, positioning a fastener extending through a second aperture of the first body of the attachment device through a first aperture of the member, and moving a portion of the first body within the channel along a length of one of the first aperture and the second aperture. Movement of the first body along the length of the one of the first aperture and second aperture may be a substantially straight path of movement. The method may also include the step of aligning a second body of the attachment device having a fourth aperture with a third aperture in the first body of the attachment device. One of the third aperture and the fourth aperture may have a length oriented transverse to the length of the one of the first aperture and the second aperture. The method may also include the steps of positioning a second fastener through the third aperture and the fourth aperture, and moving the second body along the length of the one of the third aperture and fourth aperture. The movement of the second body along the length of the one of the third aperture and fourth aperture may be a rotational movement relative to the first body. The method may also include the steps of attaching a leg to the second body, positioning the first and second body to a desired predefined position adjacent to the tabletop, tightening the first fastener until the first fastener immovably affixes the first body to the member, and tightening the second fastener until the second fastener immovably affixes the first body to the second body.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred embodiments of furniture, fastening apparatus for interconnecting furniture components and methods of making and practicing the same are shown in the accompanying drawings. It should be appreciated that like components or like parts may be indicated by the same reference number throughout the different drawings.

FIG. 5 is a fragmentary view of the second present preferred embodiment of the table.

FIG. 6 is an exploded view of a leg attached to an attachment device that may be utilized in embodiments of the table.

FIG. 7 is a top view of a leg attached to an attachment device that may be utilized in embodiments of the table.

FIG. 8 is a fragmentary view illustrating an attachment device that may be utilized in embodiments of the table attached to a leg and being inserted into a member for attachment to the member.

FIG. 9 is a perspective view of a chair utilizing attachment devices 10 to attach legs of the chair to a work surface, such as the seat of the chair.

DETAILED DESCRIPTION OF PRESENT PREFERRED EMBODIMENTS

Figure 1:
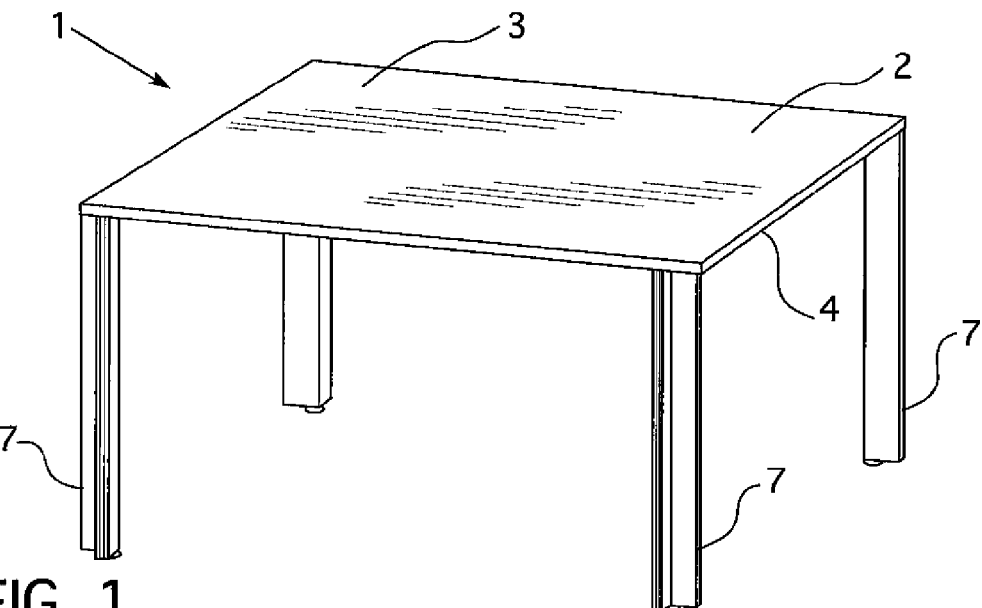
FIG. 1 is an isometric view of a first present preferred embodiment of a table.

Referring to FIGS. 1-9 an article of furniture may have a work surface. A work surface may be understood as being a structure that is oriented to support weight of a person that may sit or lean on the structure or that may support one or more things that may be positioned directly on the work surface while a person may work on the work surface. The work surface may be a level or may be inclined or declined. Examples of a work surface may include a tabletop, a countertop, a desktop, or a seat of a chair for example.

On example of an article of furniture is a table 1 that has a tabletop 2. The tabletop 2 may be supported on legs 7 positioned below the bottom of the tabletop 2. The tabletop 2 has an upper face 3 and a lower face 5 that is opposite the upper face 3. The upper face 3 is substantially flat and, preferably, is completely flat such that the upper surface is level when the work surface is supported by the legs 7. Similarly, the lower face 5 is substantially flat. In some embodiments, the tabletop 2 may be comprised of a plurality of interconnected tabletop pieces that are interconnected via multiple members 9, beams, cross braces, adhesives, fasteners, or other fastening mechanisms.

The tabletop 2 is rectangular in shape and, therefore, has four outer peripheral edges 4 that define four corners to the tabletop 2. It should be understood that different embodiments of the table may have tabletops of different shapes, such as circular shapes, elliptical shapes, or polygonal shapes. The number of peripheral edges or the number of corners a tabletop may have can be different for different embodiments of the table.

Figure 2:
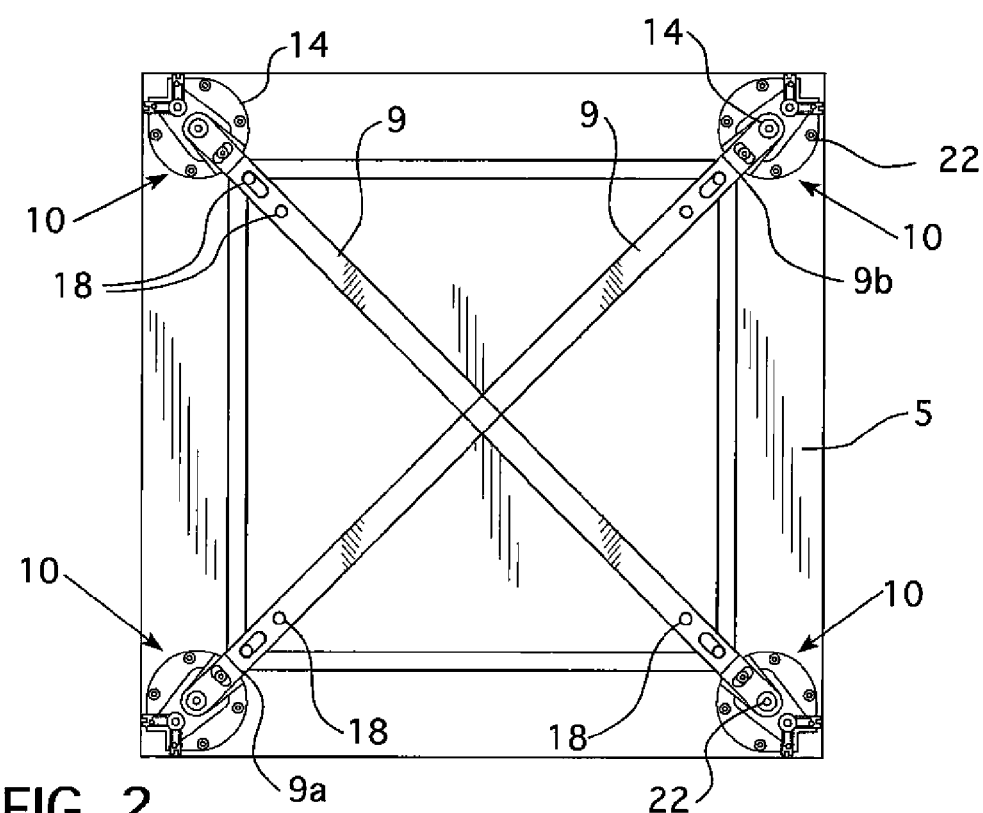
FIG. 2 is a bottom view of the first present preferred embodiment of a table.
Figure 3:
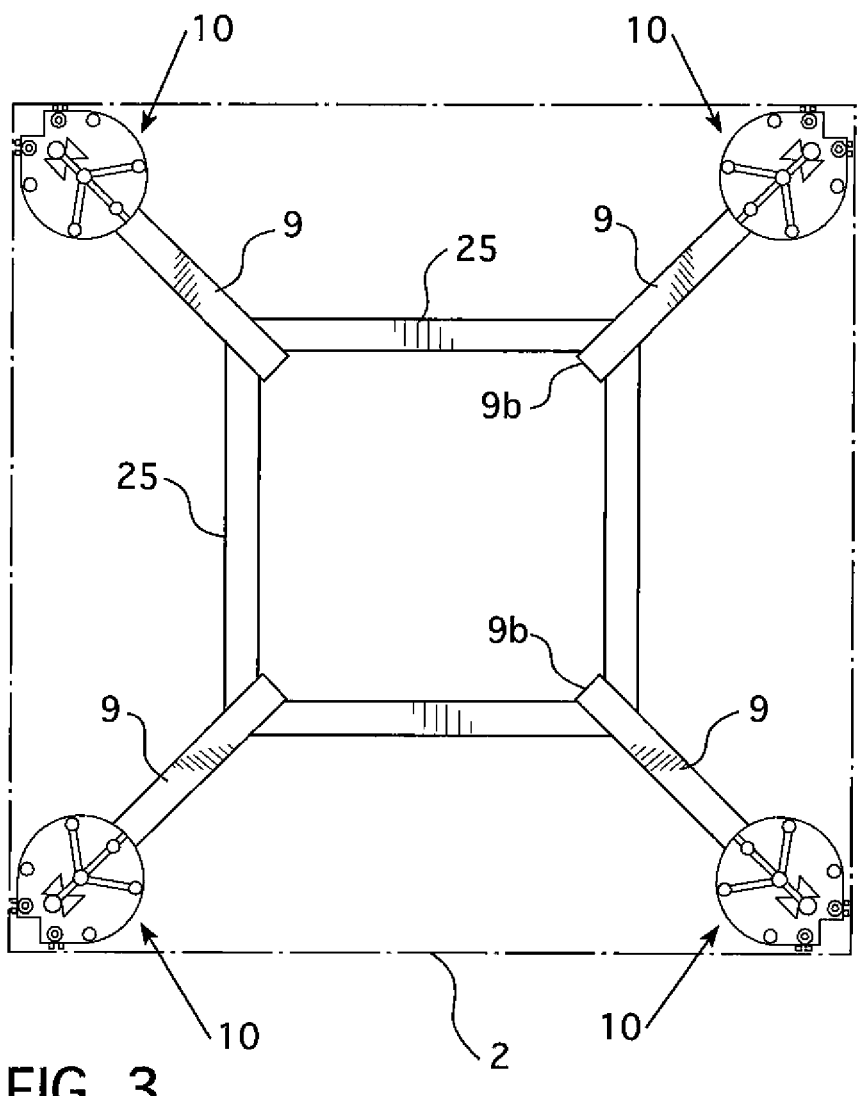
FIG. 3 is a top view of a second present preferred embodiment of a table with the tabletop shown in broken line to illustrate components of the table located below the tabletop.
Figure 4:
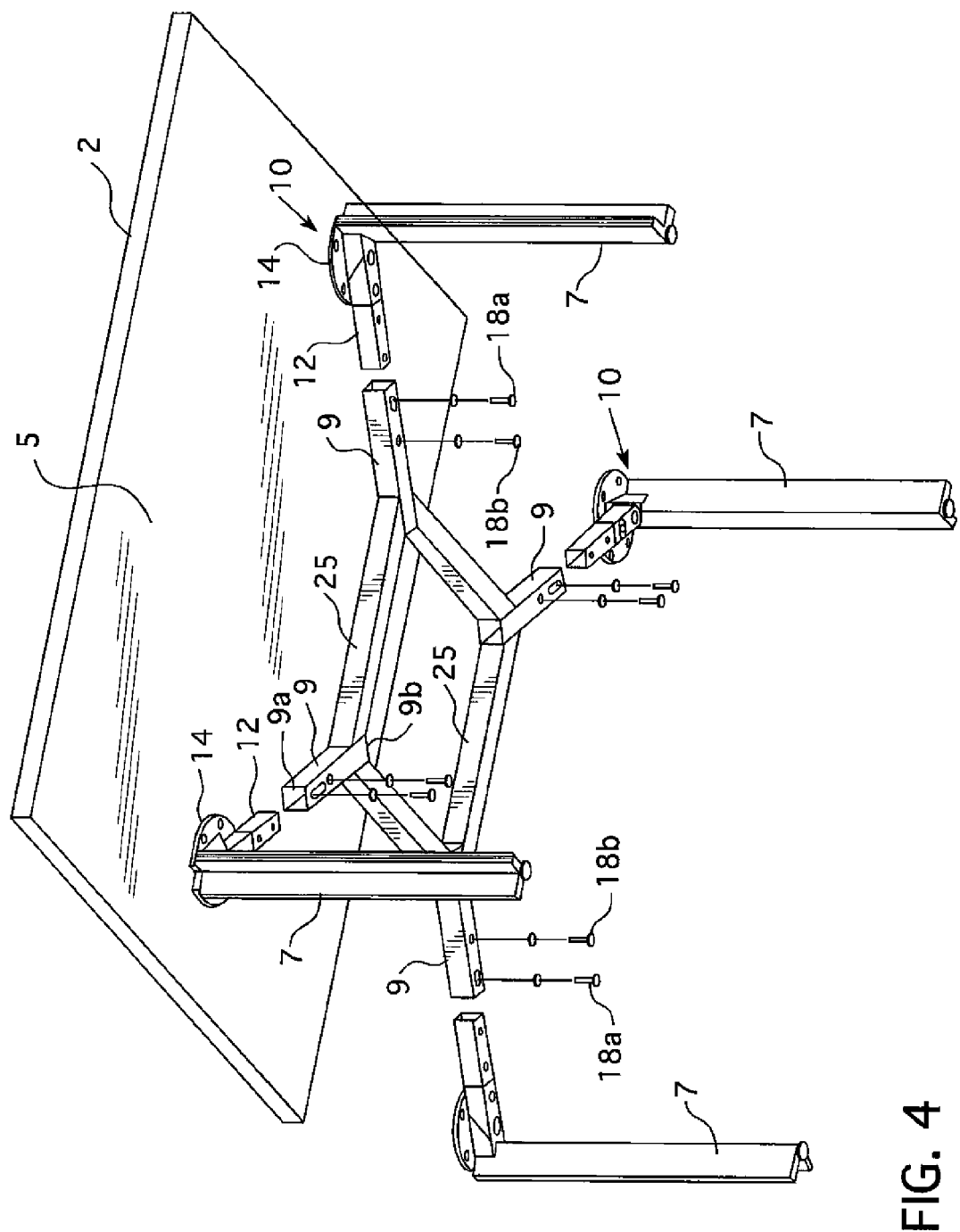
FIG. 4 is an exploded view of the second present preferred embodiment of the table.

As may be appreciated from FIG. 2, the table has a plurality of members 9, which may be cross braces or other structure that extends underneath the tabletop. Preferably, the members 9 are positioned to help support the tabletop. The members 9 may be attached to the tabletop 2 or may simply be positioned under the tabletop 2 adjacent to or in contact with the lower face 5 of the tabletop 2. For instance, each member 9 may be attached to the tabletop via a plurality of fasteners 18.

Each of the members 9 has a first end 9a and a second end 9b that is opposite the second end. The members may also have a channel that extends from the first end to the second end. Alternatively, each of the members 9 may have channels that only extend from each end 9a, 9b to a mid-point of the member to define an opening for receiving a portion of the attachment device for attachment to the attachment device.

Each end 9a, 9b for the members 9 may also have one or more slots 33 that are sized to receive one or more fasteners 18 that extend from the member 9 to a portion of the attachment device 10 for attaching the attachment device 10 to the member 9. Each slot 33 may have a length that defines a path of movement for the fastener to permit adjustable positioning of the portion of the attachment device 10 located within the member prior to tightening of the fasteners for immovably affixing or attaching the attachment device 10 to the member 9. The path of movement may be a linear path of movement, a straight path of movement or a substantially straight path of movement, such as a path of movement that is mostly straight or mostly linear. The first body 12 may be moveable both forwardly and backwardly so that the first body is moveable further within the channel 11 or further out of the channel 11. The fasteners 18 may be bolts, screws, or other types of fasteners.

The attachment devices 10 each include a second body 14 that is attached to a first body 12 via one or more fasteners. For example, the first body 12 of each attachment device 10 may be positioned in the channel 11 of a member 9 and may be attached to the second body 14 via one or more fasteners 22. Each fastener 22 may be, for example, a bolt or screw.

The first body 12 may have a slot 31 for receiving a fastener 22 that extends to the second body 14 for attaching the first and second bodies of the attachment device together. The slot 31 for the fastener 22 may have a length that extends such that the length of the slot 31 of the first body 12 is transverse to the length of the slot 33 of the member 9 to which the attachment device 10 is attached. To the extent the slot 31 is curved or arcuate, the length may be considered to be the linear length that extends transverse to the length of the slot 33 formed in the member 9. The slot 31 may define a path of travel for the second body 14 relative to the first body 12 such that the second body 14 is rotationally or laterally moveable relative to the first body 12 when the fastener 22 extends from the slot 31 to the second body 14.

Preferably, the length of the slot 31 of the first body is oriented to extend in a direction that is perpendicular or substantially perpendicular to the length of the slot 33 formed on the member 9 to which the attachment device 10 is attached. The length of the slot 31 of the first body 12 permits the second body 14 to be moved along the length of that slot 31 to permit an adjustment of the second body 14 relative to the first body 12 prior to tightening the fastener 22 for immovably affixing the second body to the first body.

It should be appreciated that the attachment device 10 may be used in connection with an article of furniture, such as a table, if the base of the table is arranged to have any of a number of different configurations. For instance, a table may have a tabletop 2 supported by a base comprised of a plurality of members 9. The members 9 may be portions of a tabletop support that supports the tabletop 2. For example, the members 9 may be interconnected together by rails or beams 25 to form a structure that helps support a tabletop that is suspended over a number of legs 7.

The legs 7 are attached to the members 9 via attachment devices 10. The attachment devices include a first body 12 that is attached to a second body 14 via fasteners 22, which include a first fastener 22a and a second fastener 22b. The first fastener 22a is positioned through a slot 31 in the first body 12 and a hole in the second body 14. Prior to the first fastener 22a being tightened to immovably attach the first body 12 to the second body 14, the first fastener 22 may be moved along the length of the slot 31 to a desired position, which permits the second body 14 to be moved relative to the first body 12 to account for any slight changes in shape that may have occurred due to tolerance ranges used in the manufacture of different table components while still permitting the second body to be located in the desired position for positioning the leg to support the table 7 where desired according to a predetermined manufacturing design.

The second fastener 22b may be passed through holes in the first and second body after the holes are aligned to permit that fastener to pass through the holes. The second fastener 22b permits the attachment between the first and second bodies to be made stronger. Of course, additional fasteners may also be used to attach the first and second bodies together.

In some embodiments, the first fastener 22a may be positioned and tightened prior to the positioning or tightening of the second fastener 22b. In other embodiments, the first fastener 22a may be positioned and tightened after the second fastener is positioned and tightened.

The first body 12 of each attachment device 10 also has holes 13 for receiving fasteners 18 for attaching that first body 12 to a respective one of the members 9 or a respective end of a member 9. The first body 12 has a size and shape that is configured to fit within a channel 11 formed in the member 9, such as a channel 11 formed in the end of the member 9 that terminates in a mouth that permits the first body 12 to be inserted into the channel 11 of the member 9. Each of the members 9 also have slots 33 formed therein. Each slot 33 has a length that extends in a direction along the length of the member 9. The length of each slot 33 may extend in a direction that is transverse to the length of slots 31 formed in the first bodies 12. Preferably, the lengths of the slots 31 are oriented to extend so these lengths are perpendicular or substantially perpendicular to the lengths of the slots 33.

The fasteners 18 may include a third fastener 18a and a fourth fastener 18b. One of the third and fourth fasteners may pass through a respective slot 33 and through a respective one of the holes 13 to attach the first body 12 to the member 9. The third fastener 18a, for example, may be moved along the length of the slot 33 to adjust a position of the first body so that the first body moves relative to the member 9 prior to tightening the fasteners 18 to immovably affix the first body 12 to the member 9. In some contemplated embodiments, multiple slots may be formed in each member 9 to provide such adjustability in attaching the first bodies 12 to the members 9 via fasteners 18. The adjustability offered by slots 33 in the members 9 permits the position of the first body 12 and each attachment device 10 to be adjusted as needed to account for slight manufacturing discrepancies that may occur due to manufacturing tolerance ranges so that the legs 7 attached to the members 9 via the attachment devices 10 are positionable where desired in accordance with a predetermined design. This ensures that a desired aesthetic effect encompassed by the design is able to be regularly and consistently achieved.

It should be appreciated that, washers may be used to help attach any of the fasteners 22 or 18 to the respective structures. Similarly, nuts or other equipment commonly used in connection with fasteners such as bolts or screws may be utilized to aid the insertion and tightening of the fasteners to the members 9, first body 12 and second body 14.

As may be appreciated from FIG. 8, trim pieces may be attached adjacent to the second body 14 and legs 7. The trim pieces may include corner pieces 41 shown in dotted line in FIG. 8 that are sized to mate with a notch or other structure or shape formed in a peripheral portion of the second body 14 for being attached to the second body 14 via an interference fit, adhesive or other attachment mechanism or combination of attachment mechanisms. The corner pieces 41 may be attached to other trim pieces or may be positioned to abut other trim pieces that may run along a peripheral edge of the tabletop. The trim pieces may be configured to matingly fit within grooves or apertures formed in the tabletop to attach the trim pieces to the tabletop via interference fits. An adhesive may also be used to help attach the trim pieces. Of course, fasteners or an attachment mechanism may be used to attach the trim pieces to the table as well or as an alternative to interference fit attachments or the use of one or more adhesives.

For example, multiple trim members may be attached to an article of furniture. At least one trim member may be attached to each edge of a work surface of the article. Corner pieces 41 may be attached to respective second bodies 14 so that each corner piece 41 is between different trim members at each corner of the periphery of the work surface. For instance, the tabletop 2 is rectangular as shown in FIGS. 1-2. There may be four corner pieces 41, one at each corner of the tabletop. Each corner piece 41 may be positioned between immediately adjacent trim members that may extend along the edges.

It should be appreciated that various design changes may be made to embodiments of the attachment device to meet a particular design objective for an article of furniture. For example, the slot 31 of the attachment device may be formed in the second body 14 instead of the first body 12. As another example, the slots 33 formed in the members 9 may be replaced with holes sized to receive fasteners and those slots may instead be formed in the first bodies 12 of the attachment devices. As another example, the shape or dimensions of the first and second bodies may be modified to meet a particular design objective or to create a desired aesthetic effect. As yet another example, the article of furniture may be a chair that has a plurality of legs attached to a seat via one or more attachment devices 10, as illustrated in FIG. 9.

While certain present preferred embodiments of furniture, attachment mechanisms for use in embodiments of furniture, and methods of making and using the same have been shown and described above, it is to be distinctly understood that the invention is not limited thereto but may be otherwise variously embodied and practiced within the scope of the following claims.

What is claimed is:

1. An article of furniture comprising:
a work surface having an upper face and a bottom face opposite the upper face;
a plurality of members, each of the members extending along the bottom face, each of the members having a first end, a second end opposite the first end, and a channel, the first end having first aperture, the channel extending through the first end;
a plurality of legs; and
a plurality of attachment devices, each of the attachment devices attaching a respective one of the legs to one of the members such that each of the members is attached to at least one of the legs, each of the attachment devices comprising:
a first body, the first body having a second aperture and a third aperture, the first body moveable within the channel of the member to which the attachment device is attached,
a first fastener, the first fastener extending through the second aperture of the first body and through the first aperture of the member to which the attachment device is attached such that the first body is moveable within the channel of the member along a length of one of the first aperture and the second aperture until the first fastener is tightened sufficiently to immovably affix the first body to the member to which the attachment device is attached,
a second body having a fourth aperture that is alignable with the third aperture, the second body attached to a respective one of the legs,
a second fastener, the second fastener extending through the third aperture and the fourth aperture such that the second body is moveable along a length of one of the third aperture and the fourth aperture until the second fastener is tightened sufficiently to immovably affix the first body to the second body, the movement of the second body relative to the first body being a rotational movement and the movement of the first body in the channel being a substantially linear movement; and
wherein one of the third aperture and the fourth aperture is a slot having a length extending in a first direction and one of the first aperture and second aperture is a slot having a length extending in a second direction that is perpendicular to the first direction.

2. An article of furniture comprising:
a work surface having an upper face and a bottom face opposite the upper face;
a plurality of members, each of the members extending along the bottom face, each of the members having a first end, a second end opposite the first end, and a channel, the first end having first aperture, the channel extending through the first end;
a plurality of legs; and
a plurality of attachment devices, each of the attachment devices attaching a respective one of the legs to one of the members such that each of the members is attached to at least one of the legs, each of the attachment devices comprising:
a first body, the first body having a second aperture and a third aperture, the first body moveable within the channel of the member to which the attachment device is attached,
a first fastener, the first fastener extending through the second aperture of the first body and through the first aperture of the member to which the attachment device is attached such that the first body is moveable within the channel of the member along a length of one of the first aperture and the second aperture until the first fastener is tightened sufficiently to immovably affix the first body to the member to which the attachment device is attached,
a second body having a fourth aperture that is alignable with the third aperture, the second body attached to a respective one of the legs,
a second fastener, the second fastener extending through the third aperture and the fourth aperture such that the second body is moveable along a length of one of the third aperture and the fourth aperture until the second fastener is tightened sufficiently to immovably affix the first body to the second body, the movement of the second body relative to the first body being a rotational movement and the movement of the first body in the channel being a substantially linear movement; and
wherein one of the third aperture and the fourth aperture is a slot having a length extending in a first direction and one of the first aperture and second aperture is a slot having a length extending in a second direction that is transverse to the first direction.

3. The article of furniture of claim 2 wherein the substantially linear movement is a straight movement and the rotational movement is at least one of a clockwise movement and counterclockwise movement.

4. The article of furniture of claim 2 wherein the work surface is a seat or a tabletop.

5. The article of furniture of claim 2 wherein the third aperture or the fourth aperture is curved and the other of the third and fourth aperture is a threaded hole.

6. The article of furniture of claim 2 wherein one of the third aperture and fourth aperture is an elongated slot and the other of the third aperture and fourth aperture is a threaded hole.

7. The article of furniture of claim 2 wherein one of the first aperture and second aperture is an elongated slot and the other of the first aperture and the second aperture is a threaded hole.

8. The article of furniture of claim 7 wherein one of the third aperture and fourth aperture is an elongated slot and the other of the third and fourth aperture is a threaded hole.

9. The article of furniture of claim 2 wherein the legs are comprised of a first leg, a second leg, a third leg and a fourth leg, the members are comprised of a first member, a second member, a third member, and a fourth member, and the attachment devices are comprised of a first attachment device, a second attachment device, a third attachment device and a fourth attachment device;
   the first body of the first attachment device attached to the first end of the first member, the first body of the second attachment device attached to the first end of the second member, the first body of the third attachment device attached to the first end of the third member, the first body of the fourth attachment device attached to the first end of the fourth member; and
   the second body of the first attachment device attached to the first leg, the second body of the second attachment device attached to the second leg, the second body of the third attachment device attached to the third leg, and the second body of the fourth attachment device attached to the fourth leg.

10. The article of furniture of claim 2 wherein the second body is comprised of a circular member integrally attached to a structure sized and shaped for insertion into an opening formed in the leg to which the second body is attached for attaching the second body to that leg.

11. The article of furniture of claim 2 wherein one of:
    the work surface is a unitary structure formed of glass, metal, wood, a ceramic, or a polymeric material, and
    the work surface is a tabletop comprised of a plurality of interconnected tabletop pieces that are interconnected via at least one of adhesives, fasteners and fastening mechanisms.

12. An article of furniture comprising:
    a work surface having an upper face and a bottom face opposite the upper face;
    a plurality of members, each of the members extending along the bottom face, each of the members having a first end, a second end opposite the first end, and a channel, the first end having first aperture, the channel extending through the first end;
    a plurality of legs; and
    a plurality of attachment devices, each of the attachment devices attaching a respective one of the legs to one of the members such that each of the members is attached to at least one of the legs, each of the attachment devices comprising:
        a first body, the first body having a second aperture and a third aperture, the first body moveable within the channel of the member to which the attachment device is attached,
        a first fastener, the first fastener extending through the second aperture of the first body and through the first aperture of the member to which the attachment device is attached such that the first body is moveable within the channel of the member along a length of one of the first aperture and the second aperture until the first fastener is tightened sufficiently to immovably affix the first body to the member to which the attachment device is attached,
        a second body having a fourth aperture that is alignable with the third aperture, the second body attached to a respective one of the legs,
        a second fastener, the second fastener extending through the third aperture and the fourth aperture such that the second body is moveable along a length of one of the third aperture and the fourth aperture until the second fastener is tightened sufficiently to immovably affix the first body to the second body, the movement of the second body relative to the first body being a rotational movement and the movement of the first body in the channel being a substantially linear movement; and
    wherein the first body has a first end and a second end opposite the first end, the second end of the first body being attached to the second body via the second fastener, and wherein the first body is tapered such that the first end of the first body is narrower than the second end of the first body.

13. An article of furniture comprising:
    a work surface having an upper face and a bottom face opposite the upper face;
    a plurality of members, each of the members extending along the bottom face, each of the members having a first end, a second end opposite the first end, and a channel, the first end having first aperture, the channel extending through the first end;
    a plurality of legs; and
    a plurality of attachment devices, each of the attachment devices attaching a respective one of the legs to one of the members such that each of the members is attached to at least one of the legs, each of the attachment devices comprising:
        a first body, the first body having a second aperture and a third aperture, the first body moveable within the channel of the member to which the attachment device is attached,
        a first fastener, the first fastener extending through the second aperture of the first body and through the first aperture of the member to which the attachment device is attached such that the first body is moveable within the channel of the member along a length of one of the first aperture and the second aperture until the first fastener is tightened sufficiently to immovably affix the first body to the member to which the attachment device is attached,
        a second body having a fourth aperture that is alignable with the third aperture, the second body attached to a respective one of the legs,
        a second fastener, the second fastener extending through the third aperture and the fourth aperture such that the second body is moveable along a length of one of the third aperture and the fourth aperture until the second fastener is tightened sufficiently to immovably affix the first body to the second body, the movement of the second body relative to the first body being a rotational movement and the movement of the first body in the channel being a substantially linear movement; and wherein the members are cross braces.

14. An article of furniture comprising:
a work surface having an upper face and a bottom face opposite the upper face;
a plurality of members, each of the members extending along the bottom face, each of the members having a first end, a second end opposite the first end, and a channel, the first end having first aperture, the channel extending through the first end;
a plurality of legs; and
a plurality of attachment devices, each of the attachment devices attaching a respective one of the legs to one of the members such that each of the members is attached to at least one of the legs, each of the attachment devices comprising:
a first body, the first body having a second aperture and a third aperture, the first body moveable within the channel of the member to which the attachment device is attached,
a first fastener, the first fastener extending through the second aperture of the first body and through the first aperture of the member to which the attachment device is attached such that the first body is moveable within the channel of the member along a length of one of the first aperture and the second aperture until the first fastener is tightened sufficiently to immovably affix the first body to the member to which the attachment device is attached,
a second body having a fourth aperture that is alignable with the third aperture, the second body attached to a respective one of the legs,
a second fastener, the second fastener extending through the third aperture and the fourth aperture such that the second body is moveable along a length of one of the third aperture and the fourth aperture until the second fastener is tightened sufficiently to immovably affix the first body to the second body, the movement of the second body relative to the first body being a rotational movement and the movement of the first body in the channel being a substantially linear movement; and
wherein the work surface is a tabletop having a first edge, a second edge, a third edge and a fourth edge; the table further comprising:
a first trim member attached to the first edge;
a second trim member attached to the second edge;
a third trim member attached to the third edge;
a fourth trim member attached to the fourth edge;
a first corner member attached to the second body of one of the attachment devices such that the first corner member is positioned adjacent to the first and second edges between the first and second trim members;
a second corner member attached to the second body of one of the attachment devices such that the second corner member is positioned adjacent to the second and third edges between the second and third trim members;
a third corner member attached to the second body of one of the attachment devices such that the third corner member is positioned adjacent to the third and fourth edges between the third and fourth trim members; and
a fourth corner member attached to the second body of one of the attachment devices such that the fourth corner member is positioned adjacent to the fourth and first edges between the first and fourth trim members.

15. The article of furniture of claim 14 wherein the second body of each attachment device is shaped to abut a portion of a respective one of the corner members.

16. A method of installing or fabricating a table comprising:
attaching a member to a bottom surface of a tabletop such that the member extends along the bottom surface, the member having a channel and a first aperture;
placing a first body of an attachment device into the channel of the member;
positioning a fastener extending through a second aperture of the first body of the attachment device through the first aperture of the member;
moving a portion of the first body within the channel along a length of one of the first aperture and the second aperture, movement of the first body along the length of the one of the first aperture and second aperture being a substantially straight path of movement;
aligning a second body of the attachment device having a fourth aperture with a third aperture in the first body of the attachment device, one of the third aperture and the fourth aperture having a length oriented transverse to the length of the one of the first aperture and the second aperture,
positioning a second fastener through the third aperture and the fourth aperture;
moving the second body along the length of the one of the third aperture and fourth aperture; the movement of the second body along the length of the one of the third aperture and fourth aperture being a rotational movement relative to the first body;
attaching a leg to the second body;
positioning the first and second body to a desired predefined position adjacent to the tabletop;
tightening the first fastener until the first fastener immovably affixes the first body to the member;
tightening the second fastener until the second fastener immovably affixes the first body to the second body; and
attaching trim around an outer periphery of the tabletop,
wherein the second fastener is tightened before the first fastener is tightened, and
wherein the first body has a first end and a second end opposite the first end, the second end of the first body being attached to the second body via the second fastener, and wherein the first body is tapered such that the first end of the first body is narrower than the second end of the first body.

17. A method of installing or fabricating a table comprising:
attaching a member to a bottom surface of a tabletop such that the member extends along the bottom surface, the member having a channel and a first aperture;
placing a first body of an attachment device into the channel of the member;
positioning a fastener extending through a second aperture of the first body of the attachment device through the first aperture of the member;
moving a portion of the first body within the channel along a length of one of the first aperture and the second aperture, movement of the first body along the length of the one of the first aperture and second aperture being a substantially straight path of movement;

aligning a second body of the attachment device having a fourth aperture with a third aperture in the first body of the attachment device, one of the third aperture and the fourth aperture having a length oriented transverse to the length of the one of the first aperture and the second aperture, positioning a second fastener through the third aperture and the fourth aperture;

moving the second body along the length of the one of the third aperture and fourth aperture; the movement of the second body along the length of the one of the third aperture and fourth aperture being a rotational movement relative to the first body;

attaching a leg to the second body;

positioning the first and second body to a desired predefined position adjacent to the tabletop;

tightening the first fastener until the first fastener immovably affixes the first body to the member; and tightening the second fastener until the second fastener immovably affixes the first body to the second body, wherein the second fastener is tightened before the first fastener is tightened, and wherein one of the third aperture and the fourth aperture is a slot having a length extending in a first direction and one of the first aperture and second aperture is a slot having a length extending in a second direction that is perpendicular or transverse to the first direction.

18. The method of claim 17 further comprising attaching trim around an outer periphery of the tabletop.

19. The method of claim 18 wherein the first body has a first end and a second end opposite the first end, the second end of the first body being attached to the second body via the second fastener, and wherein the first body is tapered such that the first end of the first body is narrower than the second end of the first body.

20. The method of claim 17 wherein the method is performed when the table is in a factory or wherein the method is performed when the table is installed in a room of a building.

21. The method of claim 17 wherein the leg is attached to the second body after the first and second fasteners are tightened.

* * * * *